Jan. 18, 1955 — R. C. KNOWLES — 2,699,895
ANGULAR RATE MEASURING SYSTEM
Filed Feb. 1, 1943 — 2 Sheets-Sheet 2

INVENTOR
R. C. KNOWLES

United States Patent Office 2,699,895
Patented Jan. 18, 1955

2,699,895

ANGULAR RATE MEASURING SYSTEM

Richard C. Knowles, New York, N. Y., assignor to The Sperry Corporation, a corporation of Delaware Application February 1, 1943, Serial No. 474,403

4 Claims. (Cl. 235—61.5)

This invention relates, in general, to angular rate measuring systems for obtaining target angular rates for fire control purposes, and, more particularly, to an angular rate measuring system especially adaptable to fire control systems of the type disclosed in copending application Serial No. 411,186 for an "Inter-Aircraft Gun Sight and Computer," filed September 17, 1941, in the names of C. G. Holschuh and D. Fram, now abandoned.

In this copending application, there is disclosed an inter-aircraft fire control system employing an unstabilized sighting device, that is, a sight in which the operators alone through their handwheels control the orientation of the sight with respect to the aircraft upon which it is mounted. The elevation and azimuth angular rates required for the predicting mechanism are obtained by measuring the control displacements of the handwheels of the respective operators, which displacements cause the sight, through variable speed drives, to rotate with respect to the aircraft at corresponding angular velocities.

Accordingly, in this copending application, the angular rates employed in the predicting mechanism are the angular rates of the sight with respect to the axes of the aircraft upon which it is mounted. In a completely general case, these rates may be considered as composed of two components: (1) the true prediction rate, which is the absolute angular rate of the line of sight with respect to space, caused by relative linear motion between the target and the aircraft; and (2) a false rate, which is the angular rate of the line of sight with respect to the aircraft, caused by rotation of the aircraft about the elevation and azimuth axes. In obtaining the true prediction angle only the first of the above rates should be employed since this rate alone determines the future angular position of the target with respect to the point in space occupied by the aircraft.

Accordingly, in fire control systems of the type disclosed in the above-named copending application, a true measure of the prediction angle will only be obtained when the second of these rates is zero, that is, when the aircraft itself has no component of rotation about the elevation or azimuth axis. Meeting this condition imposes a serious limitation on the tactical maneuvering of the aircraft, since the pilot cannot turn his craft and still rely on accurate gunfire. Moreover, because of the inherent pitching and yawing of the aircraft, it is often impossible to prevent slight momentary turning of the craft about the elevation or azimuth axis, especially when flying under poor weather conditions.

In the present invention it is proposed to obtain a measure of the total of the true prediction rate and the false rate by measuring the angular rate of the sight with respect to the aircraft as is done in the above-mentioned copending application. A measure of the false rate component of this rate is then obtained by an angular rate gyroscope which is adapted to provide a signal proportional to the absolute rate of turn of the aircraft itself with respect to space. The false rate is then subtracted from the total rate, and the resulting rate, which is the true prediction rate, is then introduced into the computing mechanism.

Accordingly, an object of the invention is to provide an improved inter-aircraft fire control system wherein compensation is made for turning of the aircraft on which the system is mounted.

Another object of the present invention is to provide methods of, and apparatus for, measuring the absolute angular rate with respect to space of the line of sight to a moving target.

A further object of the invention is to provide, in a fire control system wherein angular rates for the predicting mechanism are obtained by measuring the angular rates of a sight with respect to an unstable base, simple and readily installed apparatus for compensating said rates for the turning of said base with respect to space.

Other objects and advantages will become apparent from the specification, taken in connection with the accompanying drawings wherein the invention is embodied in concrete form.

In the drawings.

Similar characters of reference are indicated in all of the above figures to indicate corresponding parts. Arrows are used beside control shafts to indicate the direction of flow of control influence or information.

Figure 1:
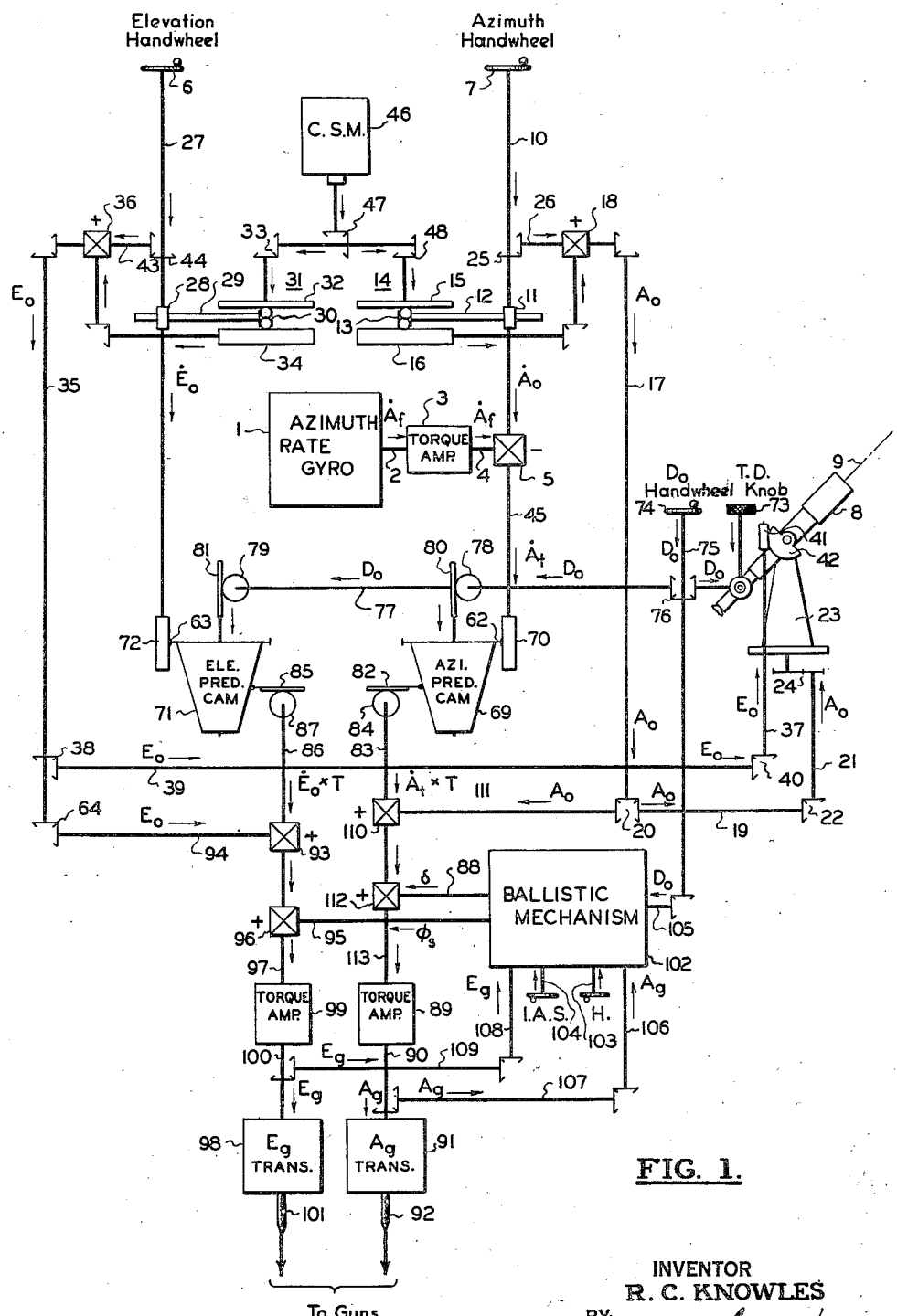
Fig. 1 is a schematic representation of the inter-aircraft fire control system of the present invention.

In Fig. 1 there is schematically shown an inter-aircraft fire control system which, with the exception of the improvement in the angular rate measuring apparatus which constitutes the present invention and which is principally embodied in the azimuth rate gyro 1, the torque amplifier 3 and the differential 5 and their inter-connecting shafts, is identical to the system shown in Figs. 1A and 1B of copending application Serial No. 411,186, now abandoned. Various elements of that application, which form no part of the present invention, have either been eliminated or shown very schematically in order to simplify the drawings and the description.

Referring now to Fig. 1, there are shown an elevation handwheel 6 and an azimuth handwheel 7, the functions of which are to rotate the sight 8 about an elevation and an azimuth axis, respectively, so that the line of sight 9 defined by sight 8 is caused to follow the target. Considering first only the operation of the azimuth handwheel 7, it is seen that rotation of the azimuth handwheel 7 actuates a shaft 10 thereby rotating the cylindrical pinion 11. Cooperating with pinion 11 is a rack member 12 which displaces the ball carriage 13 of the variable speed device 14 from its central position by an amount proportional to the angular displacement of handwheel 7.

The variable speed device 14 is illustrated as the ordinary disc, ball, and cylinder arrangement, although any suitable variable speed transmission system could be used. The disc 15, which is shown as driven from a constant speed motor 46 through gearing 47 and 48 and suitable interconnecting shafts, drives the cylinder 16 at a rate proportional to the displacement of the ball carriage 13 from its central position, and therefore, also proportional to the angular displacement of the azimuth handwheel 7.

Cylinder 16 drives the shaft 17 through the differential 18 and suitable interconnecting shafts and gearing at a corresponding rate. Shaft 17 actuates shaft 19 through gearing 20. Shaft 19, in turn, actuates shaft 21 through gearing 22. Rotation of shaft 21 causes the base 23, upon which the sight 8 is mounted, to turn about the azimuth, or a normally vertical axis, through gearing 24. In this manner, the sight 8 and the line of sight 9 defined thereby, are caused to rotate in azimuth at a rate proportional to the angular displacement of azimuth handwheel 7, thus providing what is commonly known as "rate tracking." If desired, a second input to differential 18 could be provided, as indicated by gearing 25 and shaft 26, this input being directly proportional to the angular displacement of handwheel 7. In such a case, there would be provided what is known as "aided tracking," wherein the sight 8 is caused to be rotated at a rate proportional to the displacement of control handwheel 7, and, in addition, is further rotated by an amount proportional to the displacement of control handwheel 7.

Similarly, the elevation handwheel 6 directly actuates shaft 27, which, through the cylindrical pinion 28 and rack member 29, displaces the ball carriage 30 of the variable speed device 31 from its central position by an amount corresponding to the angular displacement of handwheel 6. The disc 32, which is driven from the constant speed motor 46 through gearing 47 and 33 and the associated shafts, drives the cylinder 34 at a rate proportional to the displacement of ball carriage 30 from its central position, and therefore, proportional to the displacement of control handwheel 6.

Cylinder 34 actuates shaft 35 at a corresponding rate through the differential 36 and the interconnecting shafts and gearing. Shaft 35 is directly connected to shaft 37 through gearing 38, shaft 39, and gearing 40. Driven from shaft 37 is a cylindrical worm gear 41 which cooperates with the annular gear member 42 to cause the sight 8 and the line of sight 9 defined thereby to rotate about the normally horizontal elevation axis at a rate proportional to the displacement of control handwheel 6. As indicated with respect to the azimuth control, "aided tracking" may be provided by displacing a second input member of differential 36, such as shaft 43, by an amount directly proportional to the displacement of elevation handwheel 6. For this purpose shaft 43 is connected to shaft 27 through gearing 44.

It is apparent, therefore, that the angular displacement of shaft 10 is proportional to the azimuth component of the angular rate of turn ($\dot{A}_0$) of the line of sight 9 as the sight 8 is caused to track a target. And this is true even if aided tracking be employed, since the azimuth operator will eventually be able to track the target without any additional displacement of the control handwheel 7 when its displacement corresponds to the correct azimuth rate. It is this azimuth angular rate ($\dot{A}_0$) of the line of sight 9 with respect to the aircraft which is employed in the previously mentioned copending application Serial No. 411,186, now abandoned, in the predicting mechanism to obtain a measure of the prediction component of the azimuth lead angle.

As previously pointed out, this azimuth rate ($\dot{A}_0$) may be considered as composed of two components: (1) the true prediction azimuth rate ($\dot{A}_t$) of the line of sight 9 with respect to space caused by the relative linear motion of the target with respect to the aircraft; and (2) the false azimuth rate ($\dot{A}_f$) caused by the rotation of the aircraft itself with respect to space. In order to obtain an accurate measure of the azimuth prediction angle during turning of the craft in azimuth, only the first of these components, that is, the true prediction azimuth rate ($\dot{A}_t$), should be used in the predicting mechanism.

In the present invention an azimuth rate gyro 1 is employed to produce on its output shaft 2 a rotation corresponding to the second of these components, that is, the false azimuth rate ($\dot{A}_f$). Shaft 2 may actuate shaft 4 directly or it may actuate a torque amplifier 3 which may be of any well-known type adapted to produce on its output shaft 4 a rotation equal to that of input shaft 2, but having a greater torque. Shaft 4 actuates one input member of subtracting differential 5. The other input member is actuated from shaft 10 in accordance with the azimuth rate of the line of sight with respect to the aircraft ($\dot{A}_0$). Subtracting differential 5 is adapted to produce on its output shaft 45 an angular displacement proportional to the difference between the angular displacement of input shaft 10 and that of input shaft 4, and therefore, proportional to the true prediction rate $$\dot{A}_t = \dot{A}_0 - \dot{A}_f$$

Figure 2:
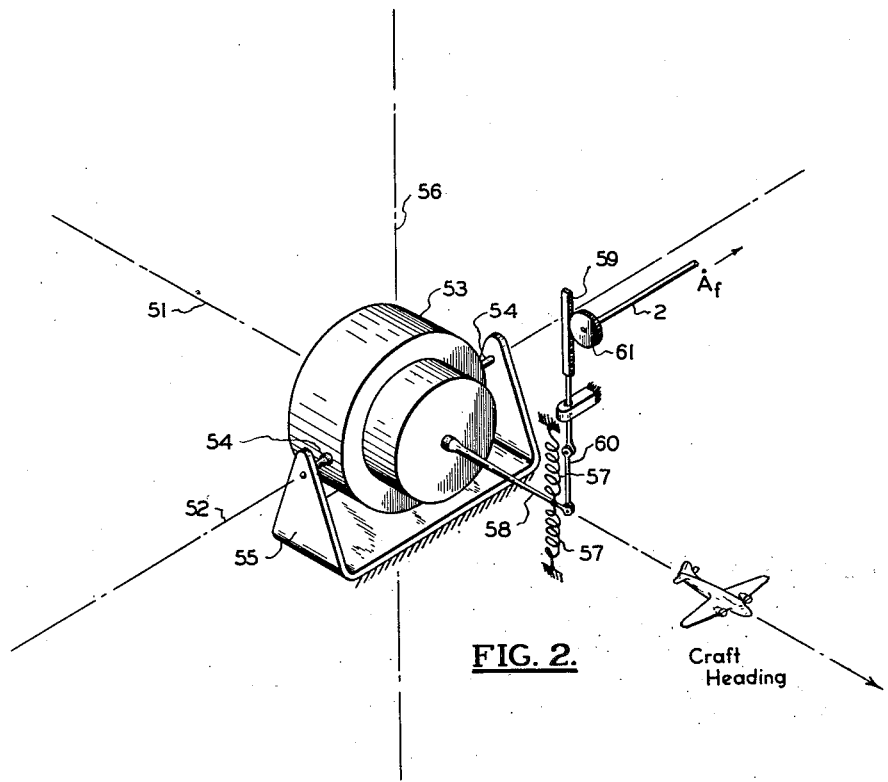
Fig. 2 is a perspective drawing of the angular rate gyroscope of Fig. 1 showing its relationship with respect to the aircraft.

The azimuth rate gyro may be of the spring-restrained two-degree of freedom type, such as is described in U. S. Patent No. 1,433,102, entitled "Turn Indicator," issued October 24, 1922, in the name of L. B. Sperry. In Fig. 2, there is schematically illustrated one such angular rate gyro which would prove satisfactory. In order to measure the rate of turn of the craft in azimuth with such a gyro, it is necessary that the spin axis 51 and the perpendicular axis of precession 52 lie in a plane which is perpendicular to the normally vertical axis 56 about which it is desired to measure the azimuth rate of turn of the craft. As shown in Fig. 2, a rotor bearing frame 53, within which it is understood the gyroscope rotor is spinning about spin axis 51, is pivotally supported in a base 55, as by supporting shafts 54, for rotation about the precession axis 52. The supporting base 55 is rigidly attached to the aircraft so as to lie in a normally horizontal plane. An extension 58 on frame 53 is centralized along the spin axis 51 by springs 57.

In operation, should the aircraft turn about the azimuth axis 56 carrying the base 55 of the gyroscope with it, the spin axis 51 will tend to precess about the precession axis 52 with a torque proportional to the rate of turn. Precession of the gyro will be opposed by the centralizing springs 57 which tend to maintain the extension 58 in its central portion. The amount of precession occurring will therefore be proportional to the rate of turn of the aircraft about the azimuth axis 56. The displacement of extension 58 from its central position, which corresponds to the amount of precession of the gyro, is transmitted to the rack member 59 through the connecting member 60. Displacement of rack member 59 causes a proportional angular displacement of shaft 2 through the pinion 61. The displacement of output shaft 2 is therefore a measure of the rate of turn of the aircraft with respect to space about the azimuth axis 56. The angular displacement of shaft 2, being therefore a measure of the false azimuth rate ($\dot{A}_f$), may be employed as heretofore described with respect to Fig. 1 to obtain the true prediction azimuth rate ($\dot{A}_t$) from the total azimuth rate ($\dot{A}_0$).

Figure 3:
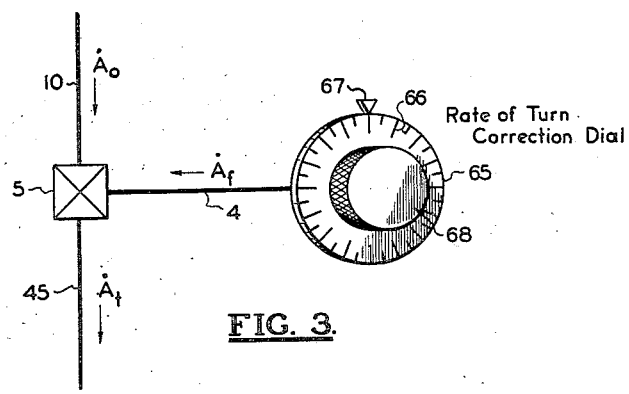
Fig. 3 is a drawing illustrating another embodiment of the present invention.

In Fig. 3 there is disclosed another embodiment of the invention which is even more readily adapted to be introduced in already installed systems of the type disclosed in copending application Serial No. 411,186, now abandoned. As is well known, practically all presently used aircraft are provided with gyroscopic rate of turn indicators, in order to provide the pilot with an indication of his rate of turn for purposes of navigation. The rate of turn indication thereby provided is a measure of the rate of turn of the craft in space and is therefore a measure of the false azimuth rate ($\dot{A}_f$). In the embodiment of the invention illustrated in Fig. 3, it is proposed to obtain false azimuth rate data ($\dot{A}_f$) from indicators already provided, and thus to dispense with the additional rate of turn gyro indicated in Fig. 2.

Referring now to Fig. 3, there is shown a rate of turn correction dial 65, having graduations 66 marked off in equal steps and cooperating with the fixed index 67. Rotation of dial 65, as by knob 68, directly actuates the false azimuth rate shaft 4 of Fig. 1. In operation, the pilot, having knowledge of the rate of turn of his craft in azimuth from an indicator provided on his instrument panel, turns knob 68 until the rate of turn may be read on dial 66 opposite the fixed index 67. He thereby rotates shaft 4 by an amount proportional to the false azimuth rate ($\dot{A}_f$). The displacement of shaft 4, as previously explained with respect to Fig. 1, may be subtracted in differential 5 from the displacement of shaft 10, corresponding to the azimuth rate of the line of sight with respect to the aircraft ($\dot{A}_0$), thereby producing on shaft 45 a displacement proportional to the true prediction azimuth rate ($\dot{A}_t$).

Referring again to Fig. 1, the azimuth prediction cam 69 is rotated an amount proportional to the true prediction rate ($\dot{A}_t$) from shaft 45 through the cylindrical pinion 70 and gearing 62. Similarly, the elevation prediction cam 71 is rotated an amount proportional to the elevation rate of the line of sight 9 with respect to the aircraft ($\dot{E}_0$) from shaft 27 through the cylindrical pinion 72 and gearing 63.

No provision has been shown in Fig. 1 to eliminate from the elevation rate ($\dot{E}_0$) the false elevation rate ($\dot{E}_f$) caused by turning of the craft about an elevation axis. It is evident that compensation for the rate of turning of the craft about its elevation axis could be made, if desired, in a manner exactly similar to that described with respect to the azimuth rate. In such a case, the angular rate gyro employed would be mounted so that its axis of spin and axis of precession lay in a plane perpendicular to the elevation axis, that is, in the normally vertical plane through the line of sight. Since this plane is dependent upon the azimuth angle of the line of sight ($A_0$), the base of the gyroscope would have to be pivotally mounted on the aircraft so as to be rotatable about a normally vertical axis in correspondence with the azimuth angle ($A_0$). However, since it is primarily desired, and most important, to compensate for the rate of turn of the craft in azimuth, and not so important to compensate for the rate of turn of the craft in elevation, no such compensation for turning of the craft in elevation has been shown.

As more fully explained in copending application

Serial No. 411,186, now abandoned, the slant range ($D_0$) of the target is a function of the target dimension (T. D.) and the dimension of the image of the target formed in the sight 8. Accordingly, by angularly rotating a three-dimensional cam within the sight 8 by an amount corresponding to the estimated target dimension (T. D.), as by a knob 73, and at the same time linearly positioning the three-dimensional cam in accordance with slant range by turning of the range handwheel 74, the lift of the cam follower, if the cam be properly designed, may be made to correspond to the dimension of the target image formed within the sight 8. When such correspondence is attained by adjusting the range handwheel until a pair of reticle lines, the separation of which is controlled from the lift of the cam follower, just encompass the target image, the angular displacement of range handwheel 74 is proportional to slant range ($D_0$). Slant range ($D_0$), appearing then as a proportional rotation of shaft 75, is transmitted by gearing 76 to shaft 77. Shaft 77 actuates the pinions 78 and 79 which cooperate with the rack members 80 and 81, respectively, to cause the azimuth prediction cam 69 and the elevation prediction cam 71 to be linearly displaced amounts proportional to the slant range ($D_0$).

As is well known, the azimuth prediction component of the total azimuth lead angle is closely approximated by the azimuth rate ($\dot{A}_t$) times the time of flight (T). Since the time of flight (T) may be considered to be a function only of slant range ($D_0$) within a high degree of accuracy, the azimuth prediction angle may be considered as a function only of azimuth rate ($\dot{A}_t$) and slant range ($D_0$). Thus, by properly designing the cam 69, its follower 82 may be caused to move an amount proportional to $\dot{A}_t \times T$, when the cam is actuated in accordance with $\dot{A}_t$ and $D_0$ as previously described. The linear displacement of follower 82, acting through the pinion 84, causes a corresponding angular displacement of shaft 83 which is therefore proportional to the azimuth prediction angle ($\dot{A}_t \times T$).

In a similar way, by proper design of the elevation prediction cam 71, its follower 85 is caused to move an amount proportional to the elevation component of the prediction angle ($\dot{E}_0 \times T$). As previously explained, the elevation prediction angle thus obtained, being equal to $\dot{E}_0 \times T$, will be in error should the craft be turning about its elevation axis. This displacement is then transmitted to shaft 86 through gearing 87.

The prediction component of the azimuth lead angle, appearing as a proportional displacement of shaft 83, is combined in differential 110 with the present azimuth angle ($A_0$), received as a proportional displacement of shaft 111 which is actuated from shaft 17 through gearing 20. The output of differential 110 is then combined in differential 112 with the ballistic component ($\delta$) of the azimuth lead angle which is received on shaft 88, as will more fully be explained hereinafter. The angular displacement of output shaft 113 of differential 112 is thus proportional to the sum of the present azimuth angle and the total lead angle, and therefore is proportional to the gun angle ($A_g$) required to effect a hit upon the target. Displacement of shaft 113 is transmitted through a torque amplifier 89, which may be of any well-known type, to shaft 90 which actuates the gun azimuth angle transmitter 91. Transmitter 91 may be of any well-known type, such as a "Selsyn" or "Telegon," which is adapted to electrically transmit the gun azimuth angle ($A_g$) to the guns through output lead 92.

In a similar manner, the differential 93 combines present elevation angle ($E_0$), received on shaft 94 from shaft 35 through gearing 64, and the prediction component of the elevation lead angle, received on shaft 86. The output of differential 93 is then combined in differential 96 with the ballistic component ($\phi_s$) of the elevation lead angle, which is received as a proportional rotation of input shaft 95, as will later be described, thereby producing on output shaft 97 an angular displacement proportional to the gun elevation angle ($E_g$) required to effect a hit upon the target. Shaft 97 actuates the gun elevation transmitter 98, which may be identical to the gun azimuth transmitter 91, through the torque amplifier 99 and shaft 100. The gun elevation angle ($E_g$) may then be electrically transmitted to the guns through lead 101.

As more fully explained in copending application Serial No. 411,186, now abandoned, the elevation and azimuth ballistic components ($\phi_s$) and ($\delta$) of the lead angle may be considered as composite functions of the slant range ($D_0$), gun azimuth angle ($A_g$), gun elevation angle ($E_g$), altitude of the aircraft (H) and the indicated air speed (IAS). Accordingly, ballistic mechanism 102 is provided, which may be of the type described in copending application Serial No. 411,186, now abandoned, or may be of any other suitable type adapted to combine these various functions so as to obtain the desired ballistic components of the lead angle. Altitude (H) and indicated air speed (IAS) may be set into the ballistic mechanism 102, as by handwheels 103 and 104, respectively. Slant range ($D_0$) is received on shaft 105 from shaft 75. Gun azimuth ($A_g$) is received on shaft 106 which is actuated from shaft 90 through shaft 107 and suitable gearing. Elevation angle ($E_g$) is received on shaft 108 actuated from shaft 100 through shaft 109 and the associated gearing. The ballistic mechanism 102 is adapted to combine this received information in such a way as to produce on output shaft 88 an angular displacement proportional to the azimuth ballistic component ($\delta$) of the total lead angle, and on output shaft 95 an angular displacement proportional to the elevation ballistic component ($\phi_s$) of the total lead angle.

Although the present invention has been illustrated as employed in an inter-aircraft fire control system, it is obvious that it may have useful application in any fire control system wherein an unstabilized sight is mounted on an unstable craft. It is also apparent that one three-degree of freedom gyroscope could be employed to compensate for turning of the craft both in azimuth and in elevation without departing from the spirit or principles of the invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a computing device of the predicting type for aircraft fire control systems wherein the computing device is moved in accordance with the rotation of a sight member on the aircraft when a target is being tracked, said computing device thereby calculating the rate of relative angular movement of said target in respect to said aircraft while the latter is proceeding along a fixed course, a gyroscope mounted for precession in said aircraft with its spin axis normally assuming a position substantially parallel to an axis of the aircraft whereby said gyroscope is arranged to precess in proportion to the rate of change in course of said aircraft, and means in said computing device operatively connected to the gyroscope for algebraically adding the precessional movement of said gyroscope to the observed angular rate of movement of the target, whereby the absolute rate of angular change of the latter may be obtained accurately irrespective of a changing course of said aircraft.

2. In a computing device of the predicting type for aircraft fire control systems wherein the computing device is moved in accordance with the rotation of a sight member on the aircraft as a target is being tracked, said computing device calculating thereby the rate of relative angular movement of said target in respect to said aircraft while the latter is proceeding along a fixed course, a gyroscope mounted for precession in said aircraft with its spin axis normally assuming a position substantially parallel to the longitudinal axis of the aircraft, whereby said gyroscope is arranged to precess in proportion to the rate of change in azimuth of the course of said aircraft, and means comprising a differential in said computing device actuated by the gyroscope for adding algebraically the precessional movement of said gyroscope to the observed angular rate of movement of the target whereby the absolute rate of angular change of the latter may be obtained accurately as the aircraft changes its course in azimuth.

3. In a computing device of the predicting type for aircraft fire control systems wherein the computing device is moved in accordance with the rotation of a sight member on the aircraft as a target is being tracked, said computing device being adapted to calculate the rate of the angular movement of said target in respect to said aircraft while the latter is proceeding along a fixed course, a gyroscope mounted for precession in said aircraft with its spin axis normally assuming a position substantially parallel to the longitudinal axis of the aircraft whereby said gyroscope is arranged to precess in proportion to the rate of change in azimuth of the course of said aircraft, means actuated by the gyroscope for transmitting the precessional movement thereof to said computing device, and differential means in said computing device actuated thereby for adding the precessional movement of said gyroscope to the observed angular rate of movement of the target whereby the absolute rate of angular change of the latter may be obtained accurately as the aircraft changes its course in azimuth.

4. In a computing device of the predicting type for aircraft fire control systems wherein the computing device is moved in accordance with the rotation of a sight member on the aircraft as a target is being tracked, said computing device being adapted to calculate the rate of the angular movement of said target in respect to said aircraft while the latter is proceeding along a fixed course, a gyroscope mounted for precession in said aircraft with its spin axis normally assuming a position substantially parallel to the longitudinal axis of the aircraft whereby said gyroscope is arranged to precess in proportion to the rate of change in azimuth of the course of said aircraft, means for transmitting the precessional movement thereof to said computing device comprising an arm attached to the gyroscope, a rack attached to said arm adapted to reciprocate as the gyroscope precesses, a shaft carrying a gear in mesh with said rack, and a differential gear in said computing device actuated by the movement of said shaft for correcting the observed angular rate of movement of said target in accordance with the operation of said differential gear by said shaft.

References Cited in the file of this patent

UNITED STATES PATENTS

| | | |
|---|---|---|
| 1,464,208 | Makaroff | Aug. 7, 1923 |
| 1,519,015 | Barr et al. | Dec. 9, 1924 |
| 1,891,397 | Watson | Dec. 20, 1932 |
| 1,900,709 | Henderson | Mar. 7, 1933 |
| 2,021,708 | Watson | Nov. 19, 1935 |
| 2,069,417 | Murtagh | Feb. 2, 1937 |
| 2,071,424 | Papello | Feb. 23, 1937 |
| 2,105,985 | Papello | Jan. 18, 1938 |